Jan. 5, 1965 A. J. HEYER 3,163,939

SCOPE BOARD

Filed Aug. 27, 1959 2 Sheets-Sheet 1

Inventor
Arthur J. Heyer
By:
Norton, Davis, Brewer & Brugman
Att'ys.

Jan. 5, 1965 A. J. HEYER 3,163,939

SCOPE BOARD

Filed Aug. 27, 1959 2 Sheets-Sheet 2

Inventor:
Arthur J. Heyer
By: Horton, Davis, Brewer & Brugman
Attys.

3,163,939
SCOPE BOARD

Arthur J. Heyer, Oak Park, Ill., assignor, by mesne assignments, to Heyer Inc., Chicago, Ill., a corporation of Illinois Filed Aug. 27, 1959, Ser. No. 836,534
5 Claims. (Cl. 33—76)

This invention relates in general to sheet holding boards for use in the preparation, viewing, embellishment, or processing of graphic representations, and has more particular reference to what is sometimes called a scope board or a scope for holding stencil and other masters of sheet form during the preparation, amending, viewing, or embellishment thereof.

While verbal portions of such masters are usually typed or otherwise mechanically inscribed on the master sheet, it is frequently desirable to add thereto script writing, shading, lettering, free-hand or mechanical drawing, and other manually inscribed representations for reproduction in or by stencil, spirit, or other duplicating or reproducing devices. To facilitate making such additions, the masters were hitherto mounted on a scope board which, like an ordinary drawing board, was adapted to rest substantially horizontally on or against the top of a suitable table or desk and included a sheet receiving top surface and sheet holding means for releasably holding a master sheet flat on that surface. With a master sheet mounted on the board, a straight edge device, various types of inscribing styli or devices, or other drawing instruments were employed to add to or otherwise embellish or to prepare the master for reproduction.

The angularity of known boards was usually that of the supporting table top or in some cases, one end of the board was supported a fixed distance above the table top and the other end rested thereon.

In use, therefore the angularity of such known board with respect to the horizontal, and its height, were fixed and determined by the angularity and height of the supporting table top. Consequently each use of the board depended upon the provision of a support on which the board could be positioned to hold it at a height and angularity suitable for the job to be performed and the physical characteristics of the user. Likewise, in use, illumination of masters mounted on the known boards was usually that from a light source placed on the table below the board. It was therefore not always practical to use such boards in processing masters where the principal illumination from above the board was desired.

An object of the present invention is the provision of a novel and improved scope board which avoids the foregoing objections.

Another object of the invention is the provision of such a scope board which is adjustable vertically and angularly with respect to the table top or other support to facilitate preparing, viewing, or embellishing masters for reproduction.

A further object of the invention is the provision of a vertically and angularly adjustable scope board which includes means for illuminating a master sheet thereon selectively from above or below the sheet supporting surface in each of a plurality of adjusted positions of the board.

Another object is to provide a scope board of the foregoing character, which is easily and readily portable.

Other objects and advantages of the invention will be apparent as it is better understood from the following description which, when considered in connection with the accompanying drawing, includes a disclosure of a preferred embodiment of the invention.

According to the invention, a flat translucent plate adapted to receive and hold a master or other sheet flat on its upper surface, is mounted on adjustable frame means supportable on a table top or other suitable supporting member and operable to position that upper surface at various elevations above, and inclinations to the supporting table top, and is illuminable from above and below its upper surface at a plurality of such elevations and inclinations by a light source mounted on the frame means for movement along that upper surface, either above or below the same. The presently preferred embodiment of the invention is shown, by way of example, in the accompanying drawing wherein:

Figures 6, 7, 8, 9, 10, 11, 12:
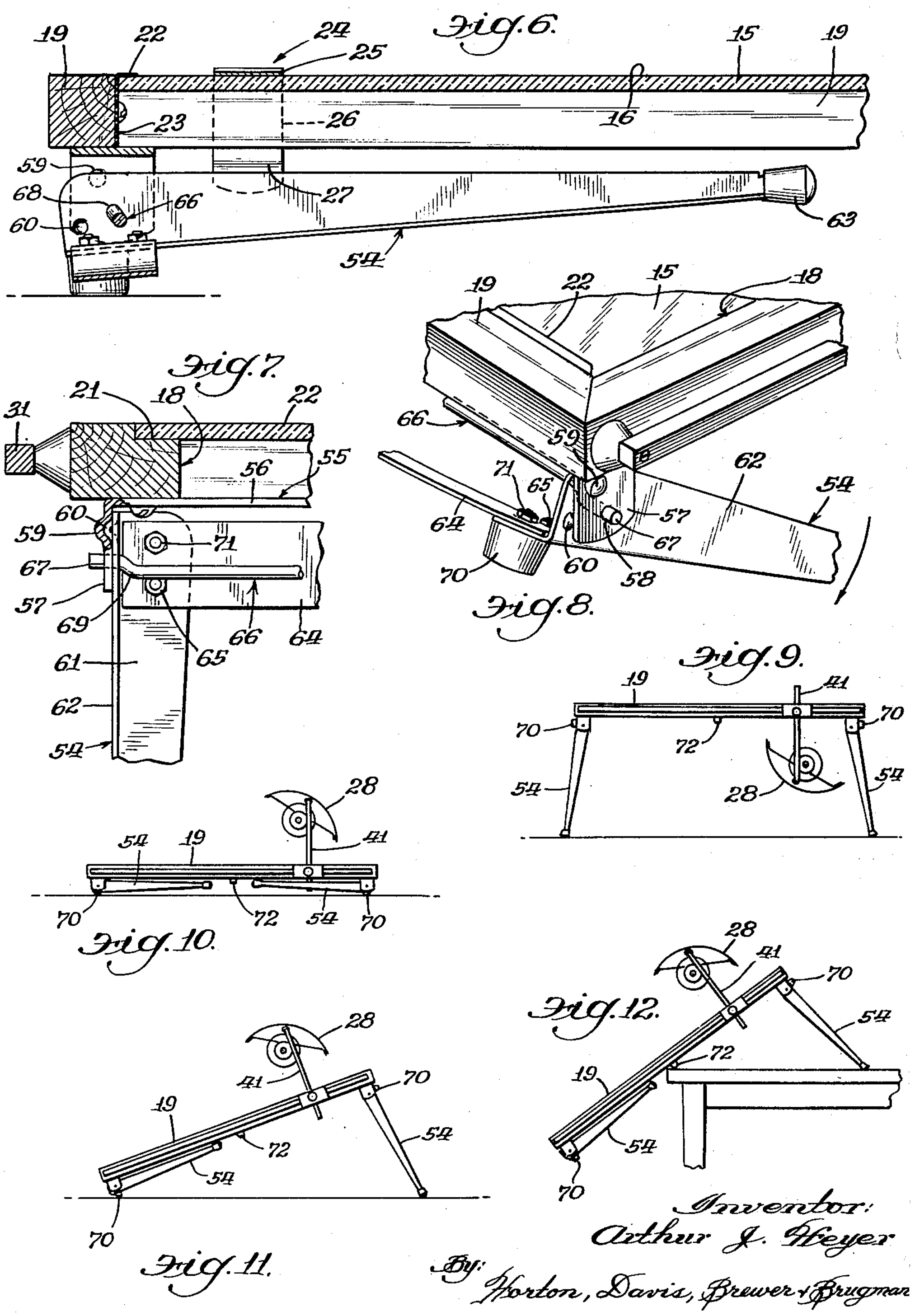
FIGURE 6 is a sectional view, on an enlarged scale, taken at line 6—6 of FIGURE 2.
FIGURE 7 is a sectional view, on an enlarged scale, taken substantially at line 7—7 of FIGURE 1.
FIGURE 8 is a perspective view of the leg construction of FIGURE 7 but viewed from the generally opposite side.
FIGURE 9 is a side elevational view of the scope board in elevated level position.
FIGURE 10 is a side elevational view of the scope board in folded, level position.

FIGURE 11 is a side elevational view of the scope board with one set of legs extended upright and the other set folded, positioning the scope board angularly relative to the table top on which it is supported; and FIGURE 12 is a view similar to FIGURE 11 but which the scope board supported partially on the top surface of the table and partially on the edge of the table, for positioning the board at an angle relative to the table top but projecting beyond the edge thereof.

Figures 1, 2, 3, 4, 5:
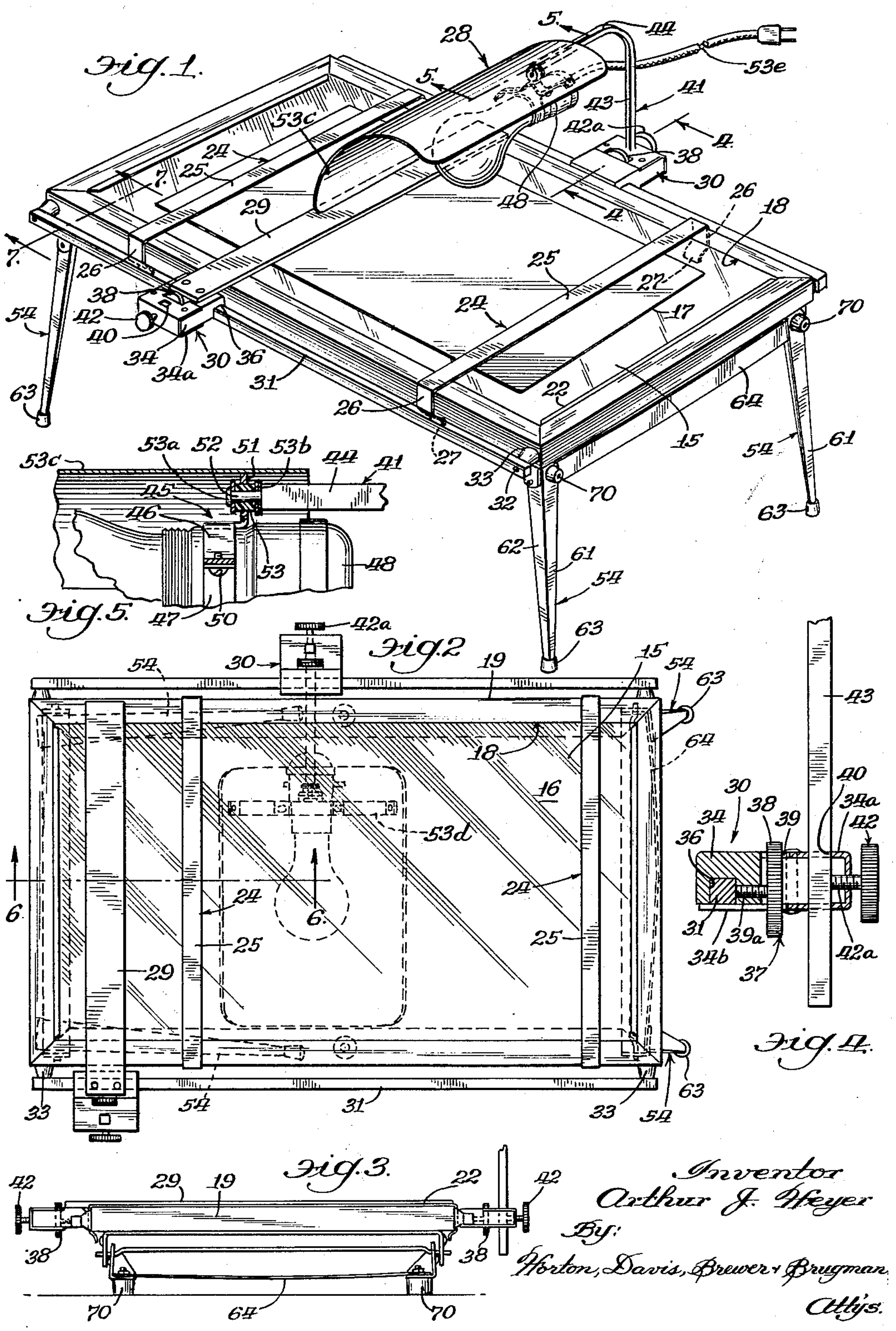
FIGURE 1 is a perspective view of a scope board embodying the features of the invention.
FIGURE 2 is a plan view of the scope board, with one set of legs in upright position, and the other set in folded position, and with the lamp disposed under the board instead of above the board as in FIGURE 1.
FIGURE 3 is an end elevational view of the scope board, with the legs folded.
FIGURE 4 is a sectional view taken at line 4—4 of FIGURE 1.
FIGURE 5 is a sectional view taken at line 5—5 of FIGURE 1.

As illustrated in the drawing, particularly FIGURES 1, 2 and 6 thereof, the novel scope board comprises a rectangular translucent plate 15 of glass or other suitable material providing a flat, smooth work-receiving surface 16 for supporting in flat position thereon a master or other sheet 17 adapted to receive manually inscribed representations. That translucent plate closes a rectangular opening 18 in a frame 19 of wood or other suitable material and is secured in the frame 19 with its work-receiving surface 16 in substantially the same plane as the upper surface of that frame by any suitable means. For example, the side frame members are grooved along their upper inner margins to provide ledges 21 (FIG. 7) parallel to their upper surfaces and spaced below them a distance substantially equal to the thickness of the translucent plate 15. With the opposite longitudinal margins of the plate 15 engaging on those ledges 21, angle strips having faces or flanges 22 engage on and extend along the end margins of the plate 15 and perpendicular faces or flanges 23 depending from the faces 22 between the ends of the plate 15 and the inner side of the adjacent end frame members and secured thereto by screws or other securing means. The plate 15 is thus fixed and secured in the frame, on respectively opposite sides thereof, by the ledges 21 and faces or flanges 22.

While various devices are known for holding masters and other sheets flat on boards providing sheet supporting surfaces, it is preferred in the present invention to employ sheet holding means which I have found affords advantages in simplicity of construction and ease of operation. Such sheet holding means, as shown in FIGURES 1 and 6, comprises one or more flat strips 24 of resilient material, such as spring metal, each including an elongated segment 25 extending across the short dimension of the scope board, and down-turned segments 26 at the ends substantially perpendicular to the segment 25, the segments 26 having terminal tab portions 27 bent inwardly, or longitudinally toward each other. In use, the strips 24 are releasably fitted or snapped over the board in position over the master or sheet 17 such as over the end portion thereof, with the segments 26 and tabs 27 extending downwardly over the side edges of the board proper or board member, the latter expressions as used herein including the plate 15 and frame 19. In this position the tabs 27 extend inwardly under the lower surface of the frame and releasably retain the strips in place. To remove them, the user grips or engages one of the tabs 27 with the finger and flexes it outwardly clear of the outer side surface of the frame and lifts that end of the strip upwardly clear of the frame whereupon the strip is free of attachment and can be lifted off the board. As many strips or sheet holding means 24 as desired may be utilized, two commonly being most useful, one at each end of the master or sheet 17. These strips are readily adaptable for any size and shape of sheet such as the master or sheet 17. Preferably the strips, and more particularly the segments 25 thereof, are inherently biased with the ends bowed upwardly, so that when the strips are snapped over the edges of the frame, the segments 25 lie flat on the plate 15 and frame 19 throughout their length and firmly hold the sheet 17 flatly in place.

The scope board includes a lamp or other light means, as referred to above, indicated generally at 28, to be described in full hereinbelow, and another instrument 29 which specifically is a straight edge or ruler. The lamp and straight edge are mounted in position by similar or identical mounting means, for providing certain interchangeability and even conjoint use, as described below. Referring first to the straight edge 29, it consists of a straight strip of suitable cross sectional dimensions as to render it convenient to use in ruling lines on the sheet 17, and of a length slightly greater than the width of the board member. It is secured to a connector 30 which is one of a pair of similar or identical connectors, the other being utilized for mounting the lamp 28. The connectors are mounted on respective rails 31, one at each side of the board, and of any suitable shape in cross-section. Each of the illustrated rails is of non-circular cross sectional shape, such as square, and extends the full length of the board member, being secured to the board member, i.e., frame 19, by suitable means such as screws 32 projected through holes in the ends of the rail and into the frame with spacers 33 interposed between the rail and frame to space the rail from the frame to accommodate the segments 26 and tabs 27 of the strips 24 and to enable sliding movements of the connectors 30.

Each connector 30, includes a body having a block 34 with a U-shape strip 34*a* secured thereto, the web portion of the latter defining an outer edge of the body. In the case of the straight edge, the connector 30 supports that instrument by abutment of the latter in overlying relation and securement to the connector by suitable means such as screws. The block 34 is provided with a transverse groove 36 slidably receiving the respective rail 31, being of the same cross sectional shape as the rail to retain the body against turning movement about the rail. If desired, the lower flange of the strip 34*a* may be extended, or have a portion 34*b* of it extended, beyond the groove as in the case of the connector supporting the lamp 28, as illustrated in FIG. 4. In the case of the straight edge, the latter rests flat on the top surface of the board proper, this being achieved by, for example, providing the top surfaces of the connector and board substantially in a common plane. The length of the straight edge preferably is such that it extends from its mounting connector 30 to the opposite far edge of the board member. The straight edge is adjustable along the board member, by virtue of sliding relationship between the connector and rail, and is releasably locked in adjusted positions by means of a lock screw 37 having a thumb wheel 38 which is disposed in an aperture 39 in the body of the connector 30 and projected through the top, or bottom, or both, for easy engagement by the fingers, and a shank 39*a* threaded through a tapped hole in the block and engageable with the rail 31. The connector additionally has a polygonal aperture 40 therethrough, disposed outwardly of the aperture 39 and arranged vertically for slidably receiving the standard 41 of the lamp or light means 28. The aperture 40 consists in vtrtically aligned holes in the flange portions of the strip 34*a*. A set screw 42 is threaded in a tapped hole in the web portion of the strip 34*a* and is extendable into the projection of the holes, with a laterally exterior thumb wheel 42*a* for engaging the standard when the latter is disposed in the aperture.

The similarity between the connectors 30 provides simplicity and economy in manufacture, but further, it provides flexibility in arrangement and use of the parts of the scope board. If desired, the lamp 28 may be mounted in the same connector 30 on which the straight edge is mounted so that the lamp will be moved with the straight edge along the board, in the use of the straight edge, or it may be mounted in a different connector 30, as illustrated, so that it may be moved independently of the straight edge.

The light means or lamp 28 is mounted by means of the standard 41, referred to, which may be a uniform rod, polygonal and complementary in shape to the aperture 40, having an upright portion 43 and a turned-over horizontal portion 44. Secured to the free end of the portion 44 is an adapter or mounting means 45 (FIGS. 1 and 5) for supporting the remaining portions of the lamp means. The adapter or mounting means 45 includes an upper strip 46 and a lower strip 47 having central semicircular portions together surrounding a conventional socket member 48 receiving an electric bulb 49. The strips 46 and 47 are secured together on opposite sides of the socket member, as by screws 50, for securing the socket member in and between the strips. The upper strip 46 has a projection 51 forming a radially extending tab having an aperture for receiving the end of the horizontal portion 44 of the lamp standard. If desired, the end of the portion 44 may be of reduced diameter, as at 52, and a bushing 53 is interposed between this reduced diameter portion and the tab 51 with the extended end of the portion 44 peened, at 53*a*, to retain the bushing in place. Washers 53*b*, or flanges on the bushing, may be provided for retaining the strips 46 and 47 in place and preventing them, and the lamp assembly, from being displaced from the standard. Pivotal movement is provided between the standard and tab 51, for pivotal movement of the lamp assembly, as explained more fully hereinbelow.

The lamp 28 includes a shade 53*c* for reflecting the light rays from the bulb onto the plate 15. The shade may be a curved sheet having a highly reflective inner surface, and is mounted in assembly by securement to extended portions 53*d* (FIG. 2) of the upper strip 46, as by riveting or spot welding. The shade 53*c* can be pivoted to different positions of angular adjustment by the pivotal movement referred to above between the standard 41 and tab 51, for distributing the reflected light as desired over the surface of the plate 15. The usual electric cord for the bulb is shown at 53*e*.

The lamp is positionable and adjustable relative to the board member in a relatively great number of ways: (*a*) positionable over the board member, for directly lighting the upper working surface of the plate 15, or under the board member for indirectly lighting through the glass plate 15, by reversing the direction the standard 41 is positioned in the aperture 40; (b) adjustable toward or from the board member by sliding the standard through the aperture 40, in either position of the lamp above or below the board member; (c) adjustable along the board member, by sliding the connector 30 along the rail 31, in either position of the lamp above or below the board member; (d) shade 51 adjustable rotationally about the longitudinal axis of the bulb, to selectively distribute the light rays over the board surface, also in either position of the lamp above or below the board member; (e) positionable selectively on the same connector 30 on which the straight edge is mounted, or on a different connector.

In order to place the scope board in elevated position so as to enable the lamp to be placed thereunder, and also to place it at different angular positions, the board is provided with legs 54. The legs are arranged in two identical pairs, one at each end of the board. Each pair of legs is hingedly mounted on the board member by mounting means 55 including a strip 56 extending across the board member and fitted flat to and secured to the under surface of the respective end member of the frame 19 (FIGS. 6 and 7), and having downturned portions 57 at its ends in the form of depending tabs or legs lying in parallel vertical planes extending longitudinally of the board. Each tab 57 is provided with an aperture 58 for receiving a pivot element associated with the respective leg 54, of the board, as explained below, and a detent element 59, preferably rounded for producing a camming effect, and forming a depression or concavity on the inner side of the leg for cooperation with a projection 60 on the leg 54. Each leg 54 of the scope board may be suitably shaped as desired but preferably is an angle shape, having flanges 61 and 62 and provided with a tip or cap 63 at its lower end for engaging the surface of the table or desk on which the board rests, this tip or cap having suitable coefficient of friction to minimize slipping on that surface.

The two legs 54 at each end of the scope board are secured together in an assembly for conjoint movement into upright and folded positions. The interconnecting means for the two legs 54 of each pair includes a cross piece 64 in the form of a strip connected at its ends with respective flanges 61 of the legs, as by means of bolts 65, the legs being oriented with those flanges directed toward each other, while the other flanges, 62, extend in the direction of the long dimension of the board, or substantially parallel with the tabs 57 of the mounting means 55, for flat engagement with the tabs, which they establish. The strip or cross piece 64 is of resilient material, such as spring metal, for respectively yielding and expanding in the movements of the legs 54. The means for providing pivotal movement of the legs 54 on the tabs 57, includes a rod or axis element 66 preferably in the form of a bail or wire having end portions 67 projected through apertures 68 in the flanges 62, and through the apertures 58 in the tabs 57, the flanges preferably being positioned on the inner surfaces of the tabs 57. The rod 66 may be provided with offsets or shoulders 69, from which the end portions 67 extend, to retain the wire in place in the assembly. The wire 66 is flexible, enabling it to be flexed or bent in order to assemble it in the legs. The leg assembly is thus swingable about the axis of the end portions 67 of the wire 66, when mounted in the tabs 57, between upright position (FIG. 1) and folded position (FIG. 3).

The projection 60, referred to above, on each leg 54 is so positioned that it will enter the depression 59 when the leg is in upright position for releasably retaining the leg in that position. The projection may be rounded complementally to the depression, for facilitating camming it out of the depression in moving the legs out of upright position toward folded position.

The strip or cross piece 64 tends to assume a straight condition and normally retains the legs spread apart with the projections 60 in the depressions 59, but yields by bowing, upon folding the legs, due to the inward movement of the legs toward each other pursuant to the camming action of the projections out of the depressions. If desired, the dimensions of the parts may be so selected that the strip 64 remains slightly bowed even when the legs are in upright position to assure bowing of the strip always in the same direction; for example, it is desired that the strip bow outwardly, to facilitate placement of, for example, the wire 66 inwardly thereof. The leg arrangement thus provides an extremely simple and effective structure.

Although many situations would necessitate positioning the scope board in raised or upright position or make it desirable to do so, with the legs 54 extended, it may also be desirable, at least on occasion, to have the board rest low and flat on the supporting surface, such as in FIGURE 3. For this purpose, projections or pads, or buttons 70 are provided on the legs 54, adjacent the top thereof, for engagement with the supporting surface when the legs are folded and the board placed thereon. The pads or buttons support the other elements of the board above the supporting surface, to avoid scratching or marring the surface, although the distance above the surface is only slight so as to position the working surface of the board as close as possible to the supporting surface. The pads or buttons 70 may be of suitable material preferably having a relatively high coefficient of friction, and may be secured in place in a suitable manner, such as by bolts 71, the heads of which are countersunk in the pads or buttons. The position of the pads or buttons adjacent the pivot axis of the legs works for stability, in that setting the scope board down on these pads or buttons does not move or swing the legs such as would make the swinging ends of the legs knock against the underside of the frame of the board.

Another feature of the scope board resides in the provision of means for mounting its stably in an angular position on the edge of table or desk, as illustrated in FIGURE 12. The legs 54 are so dimensioned, relative to the length of the board, that when folded, the interfacing ends of the legs of the two pairs are spaced apart, and in the space so provided, on each side of the board, is a pad or button 72 preferably midway between the respective ends of the legs. The pads or buttons 72 may be similar in all material respects with the pads or buttons 70, and secured to the frame as by screws. The scope board may be angularly mounted at the edge of the table or desk, as stated, by extending one pair of legs to upright position, and folding the other under the board member, placing the extended legs on the top surface of the table or desk, while the board is set down to an angular position with the edge or corner of the table or desk received between the pads or buttons 72 and the ends of the folded legs. The scope board will remain stably in this position without further support, and further will remain stable while the user applies pressure on a sheet on the board on a substantial portion of the board.

FIGURES 9 to 12 of the drawings illustrate various positions the scope board may assume for working on a sheet held thereon, namely, elevated level position with all legs extended (FIG. 9), lowered level position with all legs folded (FIG. 10), angular position with one pair of legs extended and the other folded, either fully on the top surface of the table or desk (FIG. 11), or on the edge thereof (FIG. 12). In any of these positions of the scope board, the light means or lamp may be positioned or adjusted in any of the various ways referred to above, except that in the lowered level position, it cannot of course be positioned below the board.

The scope board is of suitable size such as to provide all of the advantages of complete portability.

It is thought that the invention and its attendant advantages will be understood from the foregoing description, and it will be apparent that various changes may be made in the form, construction and arrangement of the parts without departing from the spirit and scope of the invention or sacrificing all of its material advantages, the form hereinbefore described and illustrated in the drawing being merely a preferred embodiment thereof.

I claim:

1. A portable scope board comprising, in combination, a main board member including a light transmitting plate having an upper working surface, foldable leg means on the board member for supporting it in elevated position, a rail secured to the board member at each of opposite edges and extending along and spaced from the respective edge throughout most of the length of the edge, a connector mounted on each rail for sliding movement therealong, an instrument secured to one of the connectors and positioned over the board member for cooperation with said working surface, and a lamp, each said connector having means for releasably securing the lamp thereon in either of mutually reversed positions above or below the board member.

2. A scope board of the character disclosed comprising, in combination, a main board member defining a top working surface, and leg means on the board member for positioning it selectively in elevated or lowered position, said leg means including identical pairs one at each of opposite ends of the board member and mounting means for each pair, each mounting means including depending tabs at the corners of the board member at the respective end thereof and positioned outwardly of the legs, said tabs having apertures on a common axis extending along that end of the board member, an elongated resilient strip connected at its ends to the upper ends of the legs of each pair and forming a unified assembly therewith and biasing the legs apart and into engagement with the tabs, axis means detachably disposed in said apertures in said tabs and apertures in the legs for supporting the legs on the tabs and enabling swinging movement of the legs about the axis means, and detent means on the legs and tabs including elements eccentric to the axis means which in one position of swinging movement of the legs interfit and enable the legs to be spread apart under the action of said resilient strip and releasably retain the legs in such position, but which perform a camming action therebetween in response to swinging movement of the legs out of such position and force the legs toward each other, said resilient strip yielding in a bowing action in response to the movement of the legs toward each other.

3. Leg means for use on a device for positioning the device selectively in an elevated position and in a lowered position, the leg means comprising a leg assembly including a mounting strip for securement to the device and having depending tabs at its ends, the tabs having apertures defining a common axis extending along the mounting strip, a pair of legs, an elongated resilient strip connected at its ends to the upper ends of the legs and forming a unified assembly therewith and biasing the legs apart and into engagement with the tabs, axis means detachably disposed in said apertures in the tabs and in apertures in the legs for mounting the legs and strip for swinging movement together about said axis means, and detent means on the legs and tabs including elements eccentric to the axis element which in open position of swinging movement of the legs interfit and enable the legs to be spread apart under the action of said resilient strip and releasably retain the legs in such position, but which perform a camming action therebetween in response to swinging movement of the legs out of such position and force the legs toward each other, said resilient strip yielding in a bowing action in response to the movement of the legs toward each other.

4. The invention set out in claim 3 wherein said axis means consists of a single flexible wire having end portions positioned in the apertures in the legs and tabs and offset portions engaging the legs.

5. A scope board of the character disclosed comprising, in combination, a main board member having an upper working surface and including a translucent plate defining at least a portion of said upper working surface, a pair of legs at each of opposite ends of the board member, the legs of each pair being secured together and being pivoted to the board member for swinging movement between an upright extended position and a folded position under and generally parallel with the board member, means releasably retaining each pair of legs in upright extended position whereby to enable the legs to independently support the board member resting on a flat supporting surface, each pair of legs being movable independently of the other pair, whereby to enable positioning the board member selectively in a number of different positions, namely, (*a*) in elevated level position with both pairs of legs in upright extended position, (*b*) in angular position with one pair of legs in upright extended position and the other pair in folded position, and (*c*) lowered level position with both pairs of legs in folded position, the scope board also including a lamp having a shank, and clamp means secured to the board member at an edge thereof for mounting the lamp on the board member, said clamp means having an opening removably and slidably receiving said shank of the lamp in vertical position and means for releasably securing the shank in adjusted position therein, and a rail secured to the board member and spaced from said edge thereof throughout most of the length of that edge slidably supporting said clamp means, said clamp means being operative for (*a*) detachably and reversibly mounting the lamp for selectively positioning it above or below the board member, (*b*) adjusting movement of the lamp toward or from the board member in either position thereabove or therebelow, and (*c*) adjusting movement of the lamp linearly along said edge of the board member in either position of the lamp thereabove or therebelow, and said lamp including an adjustable reflector shade for distributing light rays selectively in different areas abroad the respective upper or lower surface of the board member, in either position of the lamp above or below the board member.

References Cited in the file of this patent

UNITED STATES PATENTS

| | | |
|---|---|---|
| 645,217 | Roberts | Mar. 13, 1900 |
| 1,138,156 | Stroud | May 4, 1915 |
| 1,226,172 | Benjamin | May 15, 1917 |
| 1,263,122 | Sandstrom | Apr. 16, 1918 |
| 1,442,710 | Webster | Jan. 16, 1923 |
| 2,087,082 | Brasseur | July 13, 1937 |
| 2,098,655 | De Lisle | Nov. 9, 1937 |
| 2,131,708 | Lesperance | Sept. 27, 1938 |
| 2,190,947 | Kinzler | Feb. 20, 1940 |
| 2,215,462 | Davidson | Sept. 24, 1940 |
| 2,299,008 | De Lisle | Oct. 13, 1942 |
| 2,823,087 | Zimmer | Feb. 11, 1958 |

FOREIGN PATENTS

| | | |
|---|---|---|
| 619,007 | Germany | Sept. 20, 1935 |
| 39,969 | Netherlands | Jan. 15, 1937 |
| 855,298 | France | Feb. 12, 1940 |
| 183,088 | Austria | Sept. 10, 1955 |